(12) United States Patent
Busch

(10) Patent No.: US 8,572,894 B2
(45) Date of Patent: Nov. 5, 2013

(54) LINEAR MOTOR ARRANGEMENT

(75) Inventor: Sven Busch, Dortmund (DE)

(73) Assignee: Dorma GmbH + Co. KG, Ennepetal (DE)

( * ) Notice: Subject to any disclaimer, the term of this patent is extended or adjusted under 35 U.S.C. 154(b) by 285 days.

(21) Appl. No.: 12/733,221

(22) PCT Filed: Jul. 18, 2008

(86) PCT No.: PCT/EP2008/005905
§ 371 (c)(1),
(2), (4) Date: Feb. 16, 2010

(87) PCT Pub. No.: WO2009/021595
PCT Pub. Date: Feb. 19, 2009

(65) Prior Publication Data
US 2010/0139172 A1    Jun. 10, 2010

(30) Foreign Application Priority Data

Aug. 16, 2007  (DE) .......................... 10 2007 038 841

(51) Int. Cl.
*E05F 11/00*    (2006.01)

(52) U.S. Cl.
USPC .......................................... 49/358

(58) Field of Classification Search
USPC .......................................... 49/358, 409, 425
See application file for complete search history.

(56) References Cited

U.S. PATENT DOCUMENTS

| | | | | |
|---|---|---|---|---|
| 1,986,616 A | * | 1/1935 | Baldwin ............................ 310/13 |
| 2,337,430 A | * | 12/1943 | Trombetta ........................ 310/13 |
| 3,331,428 A | * | 7/1967 | Ford .................................. 160/331 |
| 4,641,065 A | * | 2/1987 | Shibuki et al. ................... 318/135 |
| 5,134,324 A | * | 7/1992 | Sakagami et al. ............. 310/12.04 |
| 5,172,518 A | * | 12/1992 | Yoshino ............................ 49/360 |
| 5,712,516 A | * | 1/1998 | Kabout ........................... 310/12.04 |
| 5,852,897 A | * | 12/1998 | Sukale ............................. 49/358 |
| 6,449,905 B2 | * | 9/2002 | Maki ................................. 49/360 |
| 6,469,406 B1 | * | 10/2002 | Hwang et al. ................ 310/12.29 |
| 6,543,581 B1 | * | 4/2003 | Durand et al. .................. 187/316 |
| 6,581,332 B1 | * | 6/2003 | Kim .................................. 49/358 |
| 7,504,788 B2 | * | 3/2009 | Haab et al. ...................... 318/286 |
| 7,578,096 B2 | * | 8/2009 | Haab et al. ...................... 49/409 |
| 7,592,720 B2 | * | 9/2009 | Busch .......................... 310/12.24 |
| 7,608,949 B2 | * | 10/2009 | Busch .............................. 310/14 |

(Continued)

FOREIGN PATENT DOCUMENTS

| | | |
|---|---|---|
| GB | 2 438 816 | 12/2007 |
| JP | 09 074735 | 3/1997 |
| JP | 10 025965 | 1/1998 |
| WO | WO 2006/109510 | 10/2006 |

*Primary Examiner* — Jerry Redman

(74) *Attorney, Agent, or Firm* — Cozen O'Connor

(57) ABSTRACT

A linear motor arrangement for panels, in particular sliding door leaves, movable along a travel path, as well as to a device for mounting such an arrangement includes a linear drive system having at least one stator member of a linear motor and a connecting member as components. The connecting member comprises a circuitry. The components are consecutively disposed in a row. Furthermore, the connecting member has a housing, which, at one end, has at least one connection possibility for an external energy supply. In addition, the housing, respectively the connecting member is adapted, to receive circuitry, which has additional terminals. In order to be able to run connecting lines in the connecting member, a channel is configured in the housing such that they are led out of the housing at the end of the connection possibility.

20 Claims, 10 Drawing Sheets

(56) References Cited

U.S. PATENT DOCUMENTS

| | | |
|---|---|---|
| 8,020,346 B2 * | 9/2011 | Singiser et al. ............... 49/360 |
| 2005/0172563 A1 * | 8/2005 | Komoda ......................... 49/358 |
| 2008/0100152 A1 * | 5/2008 | Busch ............................ 310/14 |
| 2008/0209813 A1 * | 9/2008 | Haab et al. ..................... 49/360 |
| 2009/0045760 A1 * | 2/2009 | Busch ............................ 318/135 |
| 2010/0139037 A1 * | 6/2010 | Hufen et al. .................... 16/88 |
| 2010/0175327 A1 * | 7/2010 | Busch et al. ................... 49/360 |
| 2010/0269415 A1 * | 10/2010 | Busch ............................ 49/358 |
| 2011/0190940 A1 * | 8/2011 | Busch ............................ 700/275 |

* cited by examiner

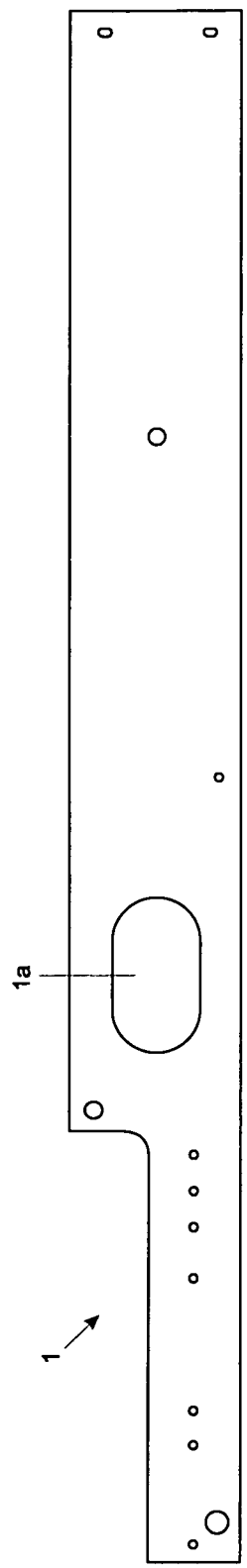

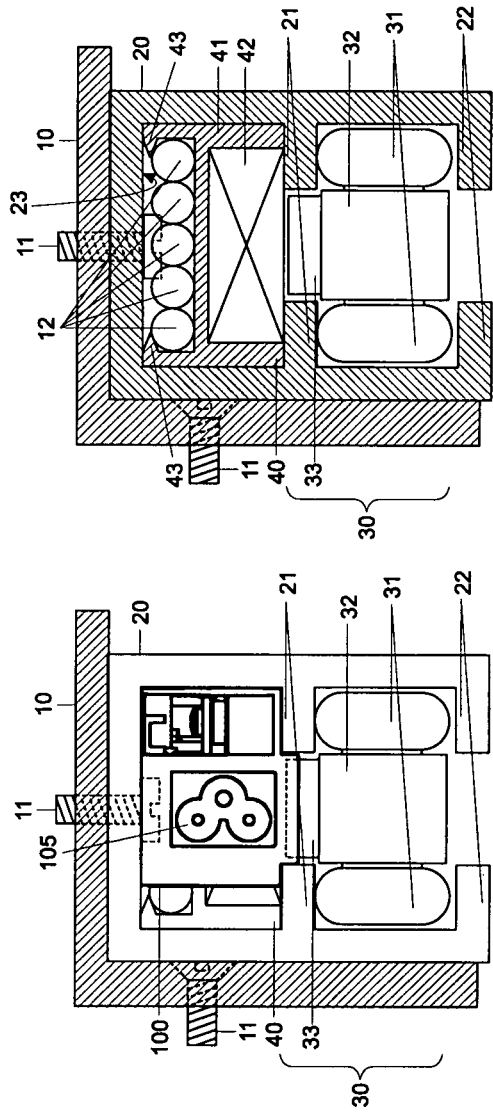
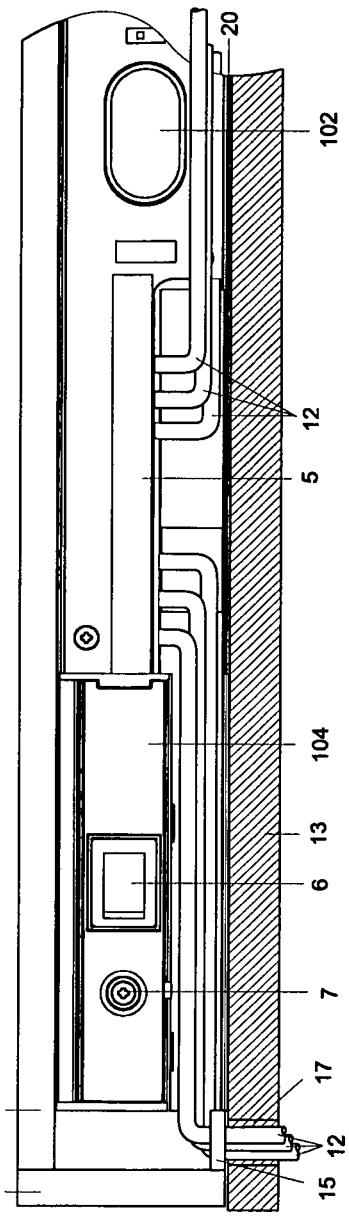

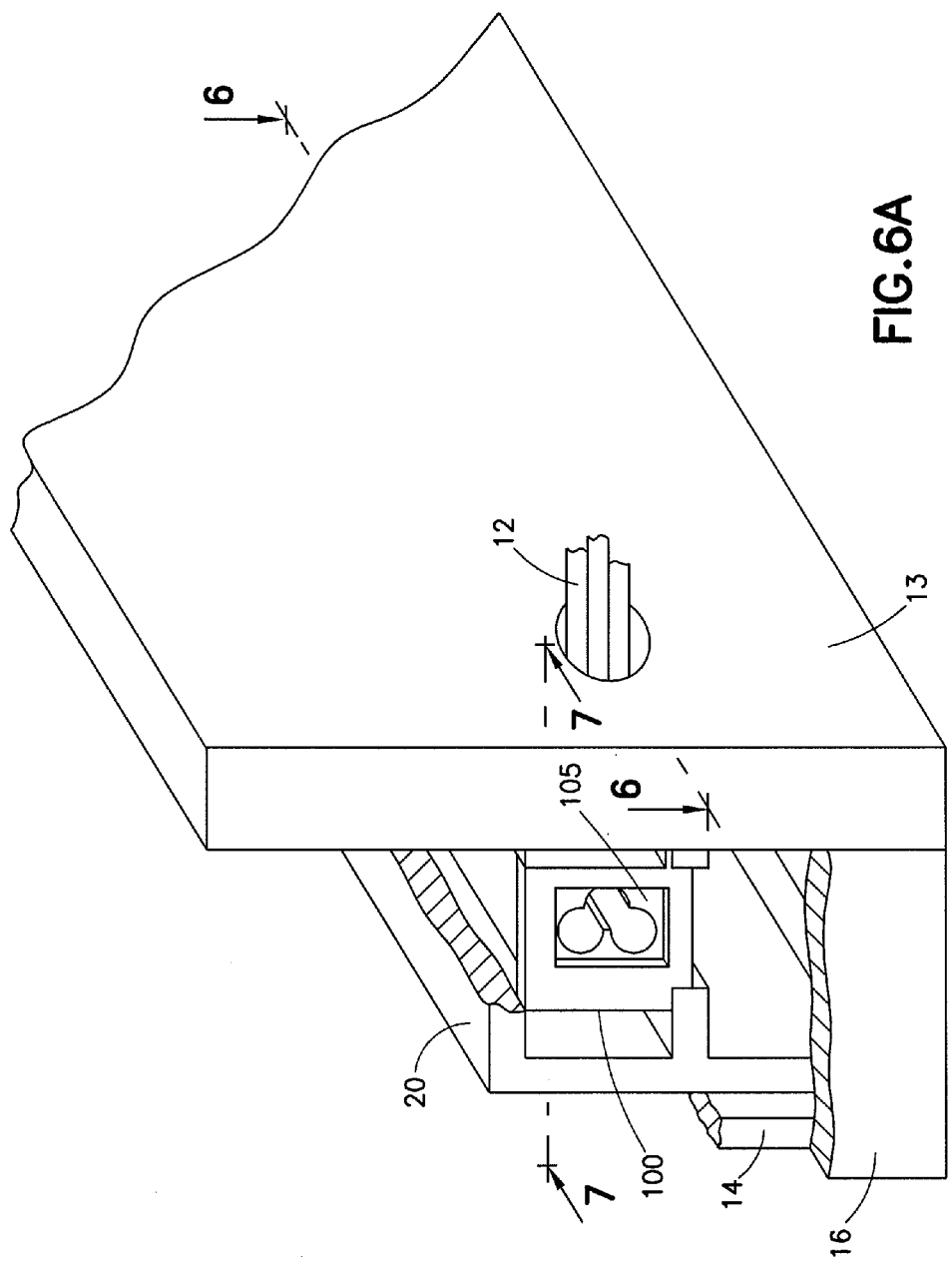

LINEAR MOTOR ARRANGEMENT

CROSS REFERENCE TO RELATED APPLICATION

This is a U.S. national stage of application No. PCT/EP2008/005905, filed on Jul. 18, 2008. Priority is claimed on German Application No.: 10 2007 038 841.3, filed Aug. 16, 2007 the content of which is incorporated here by reference.

BACKGROUND OF THE INVENTION

1. Field of the Invention

The invention relates to a linear motor arrangement for panels, in particular sliding door leaves, movable along a travel path, as well as to a device for mounting such an arrangement.

2. Description of the Related Art

Linear motor drives for sliding door systems and the like are well known. The drive system essentially consists of a linear motor, which is disposed to extend along at least one portion of a travel path of a respective sliding door leaf. Such a drive system allows for mounting in a very space-saving manner. Usually a carrying profile receives at least one stator of at least one linear motor. Associated rotors are mounted to a respective sliding door leaf and can be provided with rollers, which are disposed to roll on guiding rails.

As it is desirable to configure drive systems as inconspicuous as possible, the profile is dimensioned such as to be a little bit bigger than the exterior dimensions of the respective linear motor in cross-section. This means, that all other components, such as control circuit and power supply unit, seen in longitudinal extension of the profile, need to be consecutively disposed in a row with the stators.

However, the problem of cabling arises, for example from an exterior energy supply connection to a component, which, because of space issues, is disposed at an end of a stator remote from the terminal.

SUMMARY OF THE INVENTION

Therefore, it is an object of the invention to provide an arrangement of a linear motor which allows for minimum dimensions of the linear drive system. Another object of the invention is to provide mounting for such a linear motor arrangement.

An inventive arrangement for a linear drive system includes, as its components, at least one stator member of a linear motor and a connecting member. The connecting member comprises circuitry, which may be for example a filter member or a control circuit. The components are consecutively disposed in a row. Furthermore, the connecting member has a housing, which, at one end, has at least one connection possibility for an external energy supply. In addition, the housing, respectively the connecting member is adapted, according to the invention, to receive circuitry, which has additional terminals. In order to be able to run connecting lines in the connecting member, a channel is configured in the housing such that they are lead out of the housing at the end of the connection possibility. Thus the connecting member represents the only interface to the outside, which offers a simple and reliable possibility to connect the linear drive system.

Preferably, the reception profile has attachment devices for mounting. In the simplest case, these are through-openings, through which attachment screws pass and are screwed into a wall, while utilizing dowels, respectively while utilizing nuts or female thread sections of a mounting profile. At locations at which the reception profile has such attachment devices, the connecting housing has through-openings, which are respectively configured to pass through and extend from an exterior side of the connecting housing, facing away from the reception profile, to an exterior side of the connecting housing, facing the reception profile. Thus, the said attachment screws are accessible even with the reception profile being mounted, which makes it really easy to remove the entire linear drive system or to retighten loose attachment screws.

Preferably, the through-openings have respectively one surrounding wall section, which separates the respective through-opening from an inner space of the connecting housing and extends into the inner space of the connecting member. Bush-shaped through-openings are thus created. This lowers the risk of for example an attachment screw getting into the inner space of the connecting member and of thereby causing short circuits, for example.

The above mentioned additional terminals are preferably disposed on a circuit board, which likewise has through-openings in the area of the above mentioned through-openings of the connecting housing. The through-openings are configured similarly to the through-openings of the connecting member. With existing wall sections, they extend through the through-opening of the circuit board. As an alternative, the wall sections abut respectively from one side against the respective through-opening of the circuit board and, together with the latter, they form a recess in the shape of a bushing.

It is furthermore preferred that operating elements, for example in the shape of switches, momentary-contact push buttons, potentiometers and, if applicable, displays are disposed on the circuit board. At one exterior side, to which the operating elements and possible displays of the circuit board are oriented, the housing has through-openings, and they are thus accessible from the outside. Thereby, even after being mounted, the linear drive system allows for possible adjustments. Furthermore, the connecting member forms a connecting and adjusting center, such that a user does not have to perform adjustments or inspections at different locations of the linear drive system, which are done visually via displays.

Preferably, at least at one end facing away from the connection possibility, the connecting member has furthermore at least one terminal for a stator of the at least one linear motor. It is thus possible to couple the connecting member to at least one stator member, such that the linear drive system, without rotor members, is easy to build. Furthermore, the connecting member remains the only connection possibility to the outside. Advantageously, the circuitry is disposed close to the connection possibility of the inventive connecting member.

According to the invention, the connecting housing has at least one lead-through for lines. Preferably, each lead-through for lines has webs, which extend in an inner space of the connecting housing transversely to a longitudinal extension of the connecting housing and they have recesses or through-openings, which are respectively configured according to exterior dimensions of the lines and/or cables to be run. Thereby, a reliable and permanent installation of lines to be laid in the connecting member is possible. Preferably, at a respective exterior side of each lead-through for lines, cover members are disposed, which, in their area, cover respective lead-throughs for lines to the outside. The cover members constitute a protection against falling-out with regard to the laid lines, and thus enhance the safety.

Preferably, the cover members are releasably disposed at the housing. This allows for removing or adding lines, even if the connecting member is mounted. Preferably, the releasable disposition is effected by means of clamping the cover members to the housing of the connecting member.

The connecting member is preferably disposed at an open side of the sliding door installation, wherein the end of the connecting member, with the connection possibility, forms one end of the entire linear drive system. Preferably, the control circuit forms another end of the linear drive system. The above mentioned components are preferably received in a reception profile. A linear drive module is thus created, which simplifies mounting.

For mounting the inventive linear drive system, a mounting device is provided which has an arresting member. The arresting member is adapted to stationarily position the reception profile. Furthermore, the mounting device comprises an inserting assistant, which is disposed at an end of the reception profile facing the components to be inserted to be flush with at least one inner surface of the reception profile, onto which surface the components are pushed. Oriented towards an end, facing away from the reception profile, the inserting assistance has at least one ramp-shaped surface. The respective ramp-shaped surface is slanted to the outside with respect to the reception profile, in a direction away from the reception profile. The inserting assistance forms a guide, by which the components can be reliably pushed into the guiding profile, which helps to simplify assembling the linear drive system and to reduce errors.

It is furthermore preferred to provide a slide-in device which is adapted to stationarily receive the components of the linear drive system. At least at one side pointing in one direction, the components have reception openings, by which they can be slipped onto slip-on sections of the slide-in device, which sections are complementarily configured in cross-section. Thus a simple positioning of the components with regard to each other, such as they are to be disposed within the linear drive system, is possible.

Preferably, the slip-on sections are configured to move in or to be retractable. It is thus possible to pull the slip-on sections out of the recesses of the components shortly before the components get into the inside of the reception profile, and to thus allow for displacing the components on the slide-in device.

Preferably, the slip-on sections are made from a magnetizable material and are displaceable in a direction towards a respective reception opening of one of the components of the linear drive system and are resiliently supported in direction of respective reception openings. At one end of the spring supports, facing away from the reception openings, a magnetically excitable device is disposed such that activating the magnetically excitable device causes a retracting, respectively removing of respective slip-on sections. When the excitation of the device is absent, the springs cause the slip-on sections to automatically drive out.

Furthermore, an advance device can be provided, which has an abutment section. By this abutment section, the components are urged away from the slide-in device in the direction of the reception profile and are thus pushed into the reception profile. An automatic assembling of components and connecting member is thereby possible, which enormously simplifies mounting.

BRIEF DESCRIPTION OF THE DRAWINGS

Further features and advantages of the invention will become apparent from the following description of preferred embodiments, in which:

FIG. 3 is a circuit board according to an embodiment of the invention for the connecting member of FIG. 1;

FIG. 6 is a top view of the connecting member of FIG. 6A, provided with connecting lines;

DETAILED DESCRIPTION OF THE PREFERRED EMBODIMENTS

Figure 1:
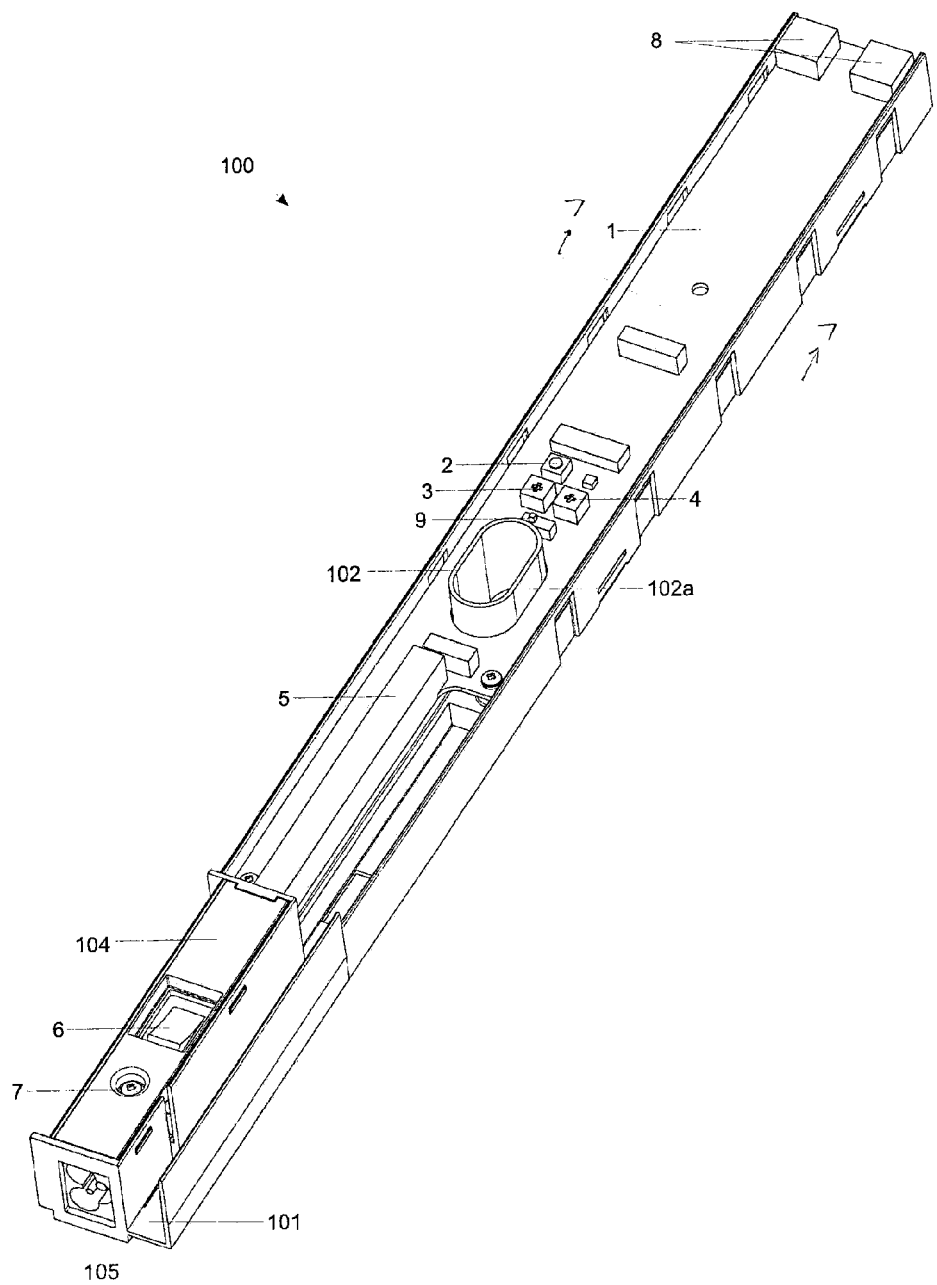
FIG. 1 is a perspective view of a connecting member, according to an embodiment of the invention, in an open condition, seen from an underside.

FIG. 1 is a connecting member 100 for a linear motor arrangement according to the invention. The connecting member 100 serves to connect an entire linear drive system to the outside. Thus, cabling is limited to this member and it is not necessary to open the linear drive at various locations and to realize connections or to perform adjustments.

The connecting member 100 comprises a circuitry 104, which is preferably disposed at an end of the connecting member 100. Preferably at a front side of the circuitry 104, a main power supply 105 is provided for connecting to a non-illustrated power supply cable. Preferably the circuitry 104 comprises a power switch 6, such that the linear drive system can be switched off or on during the mounted condition.

In addition, a connecting circuit board 1 may be provided, which comprises for example a reset switch 2, potentiometers 3, 4 for adjusting travel speeds for example, a mode switch 9 and/or connecting terminals 5 for additional connecting lines 12, which are shown in FIG. 6. The connecting terminals 5 may be provided with screws for attaching a respective connecting line 12.

Figure 5C:
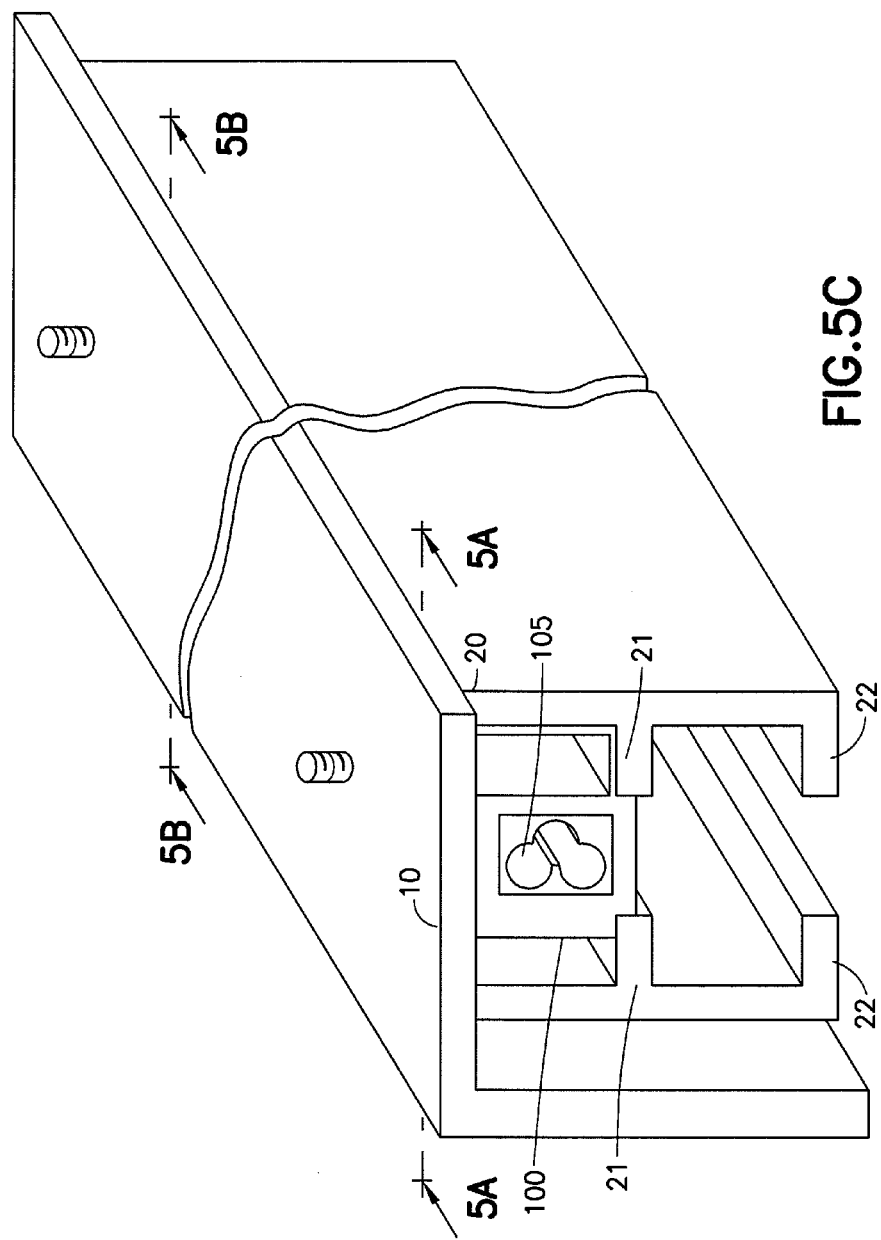
FIGS. 5A and 5B are cross sections of a linear drive system of FIG. 5C.

Furthermore, at least at one end, seen in longitudinal extension, the connecting member 100 comprises at least one terminal 8 for a stator member 40 (FIGS. 5A, 5B). Preferably it is intended for the terminal 8 to be formed by a connector, which is plugged into a socket connector in the respective stator member 40. When fitting together the connecting member 100 and the stator member 40, in addition to a mechanical connection an electrical connection is realized as well. At an end, facing the stator member 40, latching elements, for example in the shape of latching projections or noses may be configured which engage in latching receptions, which are configured at an end of the stator member 40 facing the connecting member 100. The disposition of latching noses and latching receptions may be configured reversed or combined, such that both connecting member 100 and stator member 40 have latching noses and latching receptions.

Preferably, the components of the linear drive system, which are not to be mounted at a panel, such as a sliding door leaf, movable along a travel path, namely all the members of the linear drive system, except for the rotor members 30 of a linear motor illustrated by way of example in FIG. 5A, are received in a reception profile 20, which is illustrated in FIGS. 5A and 5B.

The reception profile 20 is usually attached at a wall or a mounting profile 10. The attachment is typically realized by attachment screws 11. To be able to attach the reception profile 20, through-openings 102 are configured at locations in the connecting member 100 corresponding to the attachment screws 11. In the mounted condition of the connecting member 100, all attachment screws 11 are thus accessible.

To prevent the attachment screws 11 from getting into the inside of the connecting member, and from causing problems such as short circuits, the through-openings are provided with a wall section 102a, which interconnect the through-openings and separate them from the inside of the connecting member 100. A continuous bush-shaped recess is thus created. Thereby an altogether stiffened structure is given.

At the locations of the through-openings 102, the circuit board 1 likewise has through-openings 1a, as can be seen particularly well in FIG. 3. The through-openings 1a are configured according to the corresponding through-openings 102 in the connecting member 100, respectively according to an exterior contour of a respective corresponding wall section 102a. It is thereby possible to insert the circuit board 1 into the connecting member 100 such that the circuit board 1 does not obstruct the through-openings 102 and that the attachment screws 11 remain accessible.

In a direction, seen transversely to its longitudinal extension, the circuitry 104 has a dimension which is smaller than an interior dimension of the connecting member 100 in this area. A channel-shaped hollow space is thus created between the filter member 104 and the inner side of the connecting member 100, which space is provided as the duct 101 for laying connecting lines 12 to the connecting terminals 5. The duct 101 extends from an area of the connecting terminals 5 to an end of the connecting member 100 where the main power supply 105 is disposed. All connecting lines 12, which need to be connected to the linear drive system, can be coupled to the linear drive system at a single location, namely via the connecting member 100. Simply one cable duct or cable pit needs to be provided on the building site, which enormously simplifies cabling on the building site.

Preferably, in the area of the connecting terminals 5, the circuit board 1 is configured to terminate with a side of the connecting terminals 5 facing the duct 101 or to project only slightly beyond it. A duct 101 is thereby created which preferably covers a maximum height of the inside of the connecting member 100, such that many lines or cables can be laid. FIG. 3 shows the circuit board 1 in a top view.

Figure 2:
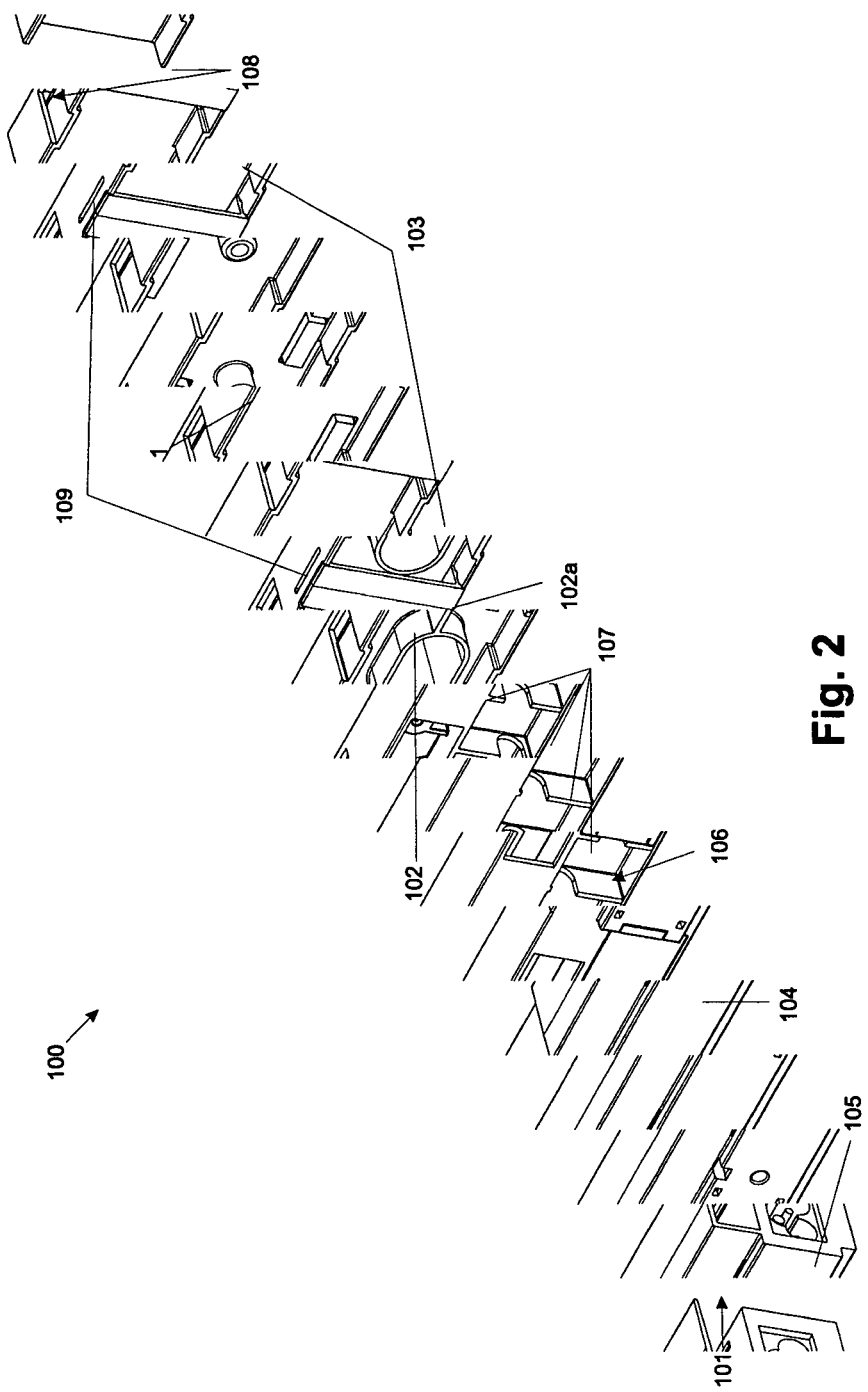
FIG. 2 is a perspective view of the connecting member of FIG. 1, seen from a top side.

As shown in FIG. 2, a lead-through for lines 106 adjoins an end of the circuitry 104 facing away from the main power supply 105. This lead-through for lines 106 serves for running lines or cables, which need to be laid to other components of the linear drive system. In order to be able to lay the lines or cables in a fixed manner, webs 107 are provided, respectively configured, which have recesses into which the lines or cables are places and, if required, clamped. This allows for bend-free cable laying. In order to prevent the laid lines or cables from falling out, additional cover members 103 are disposed, respectively integrally configured with a housing of the connecting member 100.

In the event of a separate configuration, the cover members 103 are in a latching engagement with respective inner sides 108 of the connecting member 100, respectively with recesses 109 configured therein. As an alternative, they are clamped in the inner sides 108.

Figure 4A:
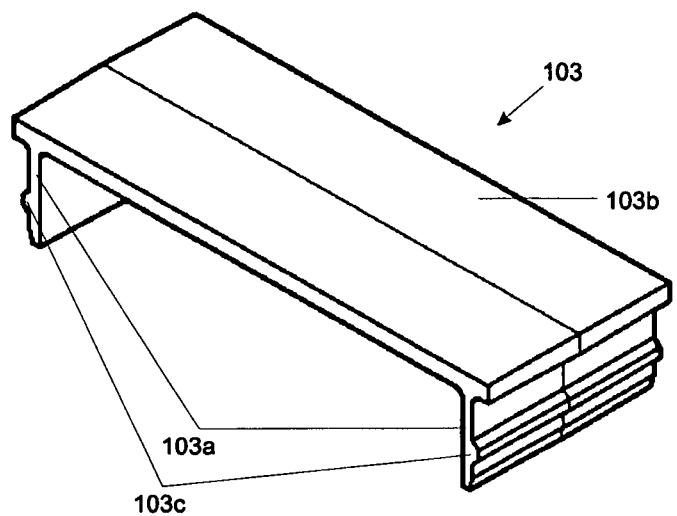
FIGS. 4A and 4B are a cover member for FIG. 2 in an enlarged view.
Figure 4B:
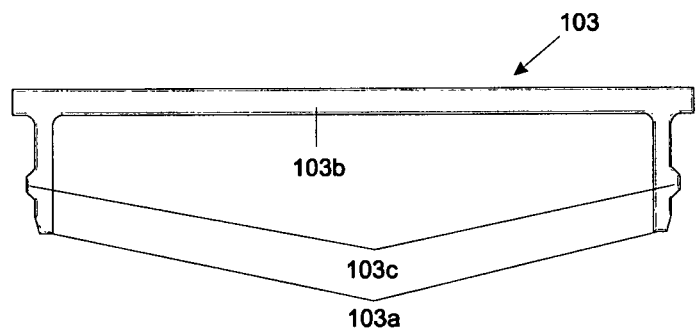

An enlarged cover member 103 of FIG. 2 is illustrated in FIG. 4. In the event of the above described latching engagement, the cover member has two arm sections 103a, which protrude to extend from a cover section 103b in the same direction. Each arm section 103a has a projection 103c, which protrudes in a direction to the outside and, once mounted, extends in a direction of a longitudinal extension of the connecting member 100. Preferably, this projection 103c forms a latching projection, which can be brought into latching engagement with an above described latching recess 109. As an alternative or in addition, at least the arm sections 103a are made from a material which is elastic to a certain degree. When being inserted into the connecting member, the arm sections 103a are bent inwards, i.e. towards each other, and are brought into friction contact with inner sides 108 of the connecting member 100 and are thus clamped in the connecting member 100.

FIGS. 5A and 5B is the linear drive system in the mounted condition from a front side of the linear drive system (FIG. 5A), once in a view on the connecting member 100 and once, from the same line of vision, in a section through a stator member 40 (FIG. 5B).

According to FIG. 5A, the reception profile 20 is mounted to the mounting profile 10, which in turn is mounted at a non-illustrated wall 13 by means of attachment screws 11, illustrated on the left side.

The reception profile 20 is mounted by means of attachment screws 11, illustrated in the centre in FIG. 5A. Preferably, the reception profile 20 has projections 21, which subdivide the reception profile 20 into an (upper) component reception space and a (lower) rotor member reception space.

Preferably, the rotor members 30 are respectively disposed to roll, by means of rotor rollers 31, on at least one downward oriented running surface of the projections 21. In addition, projections 22 can be configured in the reception profile 20, where rotor rollers 31 also roll on their upward oriented surfaces. Preferably, a body 32 is disposed between the rotor rollers 31, at which the rotor rollers 31 are freely rotatably mounted. At a side facing the upper reception space of the reception profile 20, the body 32 is provided with a rotor, which is preferably formed by a row of magnets 33, extending in longitudinal direction, or it is simply formed by a part made from magnetizable material.

Stator members 40, such as shown in FIG. 5B, are likewise disposed, respectively received in the upper reception space of the reception profile 20. As can be seen, the stator member 40 has preferably a stator profile 41, which is preferably H-shape configured in cross-section. A stator, which is formed by a row of coils, which are disposed consecutively in a row, is disposed in a thus formed lower recess. An upper recess of the stator profile 41 is provided to receive connecting lines 12, which are to be laid from one end to another end of the stator member 40 across the latter.

To prevent the connecting lines 12 from getting in contact with an upper, downward oriented inner side of the reception profile 20 and from being possibly damaged due to friction when inserting the stator profile 41 into the reception profile 20, a spacer is provided. According to FIG. 5B, this spacer is formed by two projections 43 facing each other. Connecting lines are laid between the projections such as to touch each other. Exterior connecting lines 12a re prevented from moving to the top and thus can not get in touch with an inner side 23. Preferably, the touch contact between the connecting lines is so high that also connecting lines run on the inside are prevented from moving towards the inner side 23.

The above described H-shaped cross-sectional shape of the reception profile 20 allows for a particularly small height of the stator member 40, which allows for a particularly simple laying of the connecting lines 12.

As an alternative, the stator member 40 is closed to the top. This means, the upper reception space, seen in cross-section, is completely closed.

FIG. 6 is the connecting member 100 of FIG. 1 in a partial top view. In this case, the reception profile 20 is mounted to a wall 13. Lines 12, to be laid to other components within the linear drive system, are respectively connected to a connecting terminal 5 of the circuit board 1. Connecting lines 12, external with regard to the linear drive system, are led out to a sketched cable pit 17 in the wall 13. As a protection means, these connecting lines 12 are mechanically fixed by means of an attachment web.

In the mounted condition, the reception profile 20 is visually hidden by a screen, respectively a casing 14. Respectively at one side of the casing 14, it is furthermore preferred to mount, respectively to dispose an end cap 16. Only one side of the covering 14 is illustrated in FIG. 6 by way of example.

Figure 7:
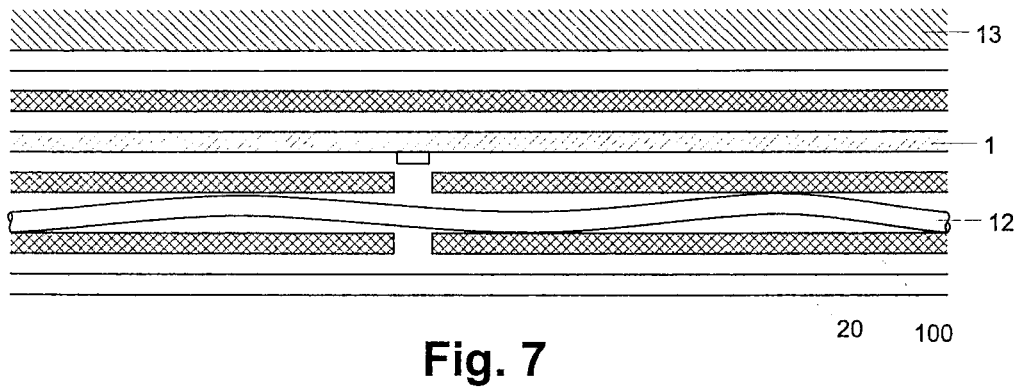
FIG. 7 is a longitudinal section through the connecting member of FIG. 1, inserted into a reception profile mounted to a wall.

FIG. 7 is a longitudinal section through the connecting member 100, inserted into a reception profile 20 mounted to a wall 13. Preferably an insulation layer is provided between the circuit board 1 and the laid connecting lines 12. As an alternative, the circuit board 1 is cast in an insulating material. The connecting lines 12 are preferably electrically insulated at both sides. In the direction of the reception profile 20, the electrical insulation can be realized by means of a housing wall of the connecting member 100.

Preferably another electrical insulation is provided at a side of the circuit board 1 facing away from the connecting lines 12, which insulation is preferably formed by a housing wall of the connecting member 100. At locations, at which operating elements are provided on the circuit board 1, through-openings are provided in the insulations, in the direction of connecting lines 12 in FIG. 7, i.e. away from the wall 13. Preferably the through-openings are disposed such as to be located at an underside of the reception profile 20 facing away from the wall, such that these operating elements are also accessible in the mounted condition of the connecting member 100.

Figure 8:
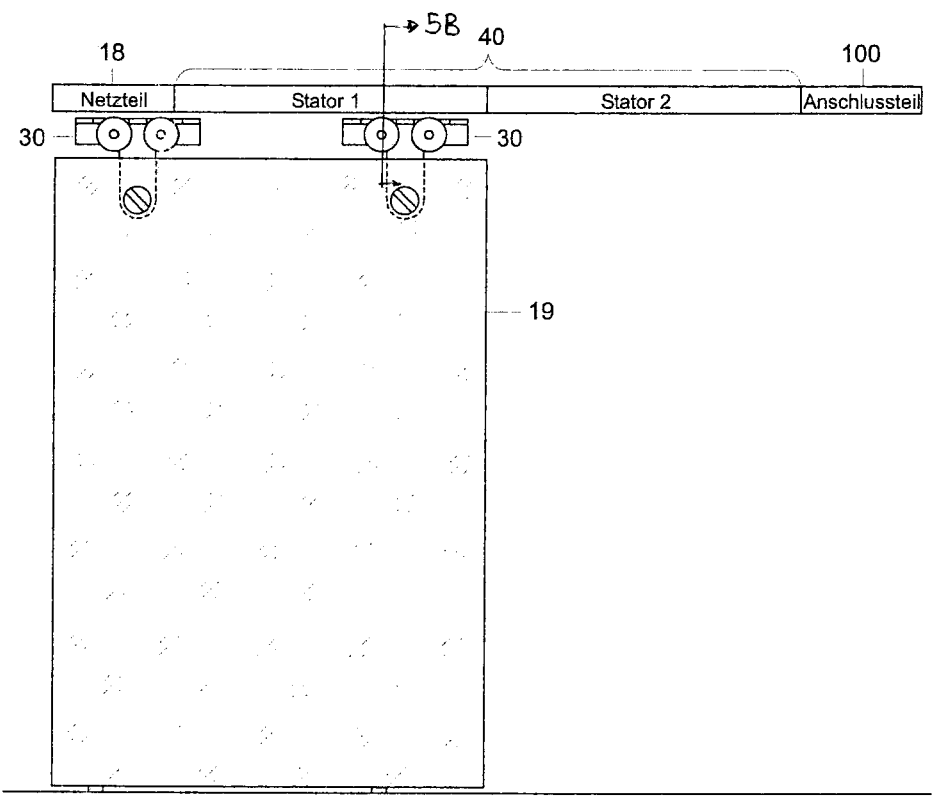
FIG. 8 is a sliding door installation with an arrangement of a linear drive system according to an embodiment of the invention.

FIG. 8 shows a sliding door installation with an arrangement of a linear drive system according to an embodiment of the invention. The reception profile 20 and a possible wall 13 or a mounting profile 10 are omitted. A sliding door 19 is provided with rotor members 30, which, among others, have the function of a carriage. The connecting member 100 is preferably disposed at an open side of the sliding door installation, illustrated on the right side in FIG. 8, i.e. a side which is cleared for the passage of people. A power supply unit 18 is disposed at an opposite closed side of the sliding door installation. This disposition may be required, if, as shown in FIG. 8, it is for example required that the stator 40 with its stator members, at any time, be in operative connection with both rows of magnets of the rotor members 30. In this case, the power supply unit and the connecting member 100 can not be disposed at one end of the linear drive system.

A linear motor arrangement provided with the connecting member 100 thus offers much freedom with regard to a disposition of the components of the linear drive system and thus adaptability to different sliding door installations. A connection from the outside can be realized at a single location.

Figure 9A:
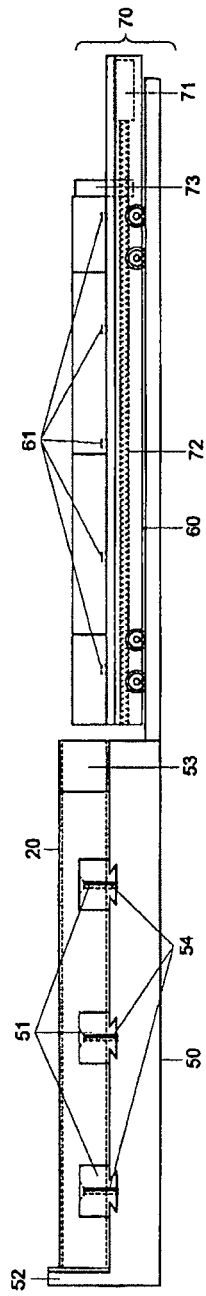
FIGS. 9A, 9B, and 9C are a mounting device according to an embodiment of the invention.
Figure 9B:
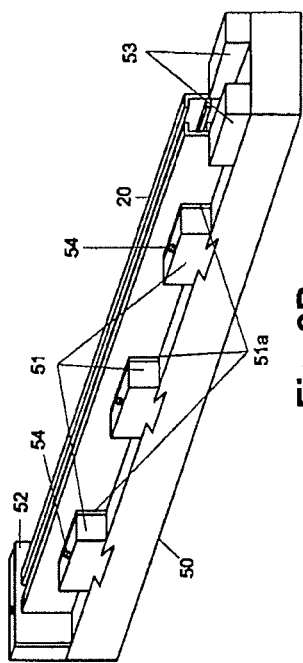
Figure 9C:
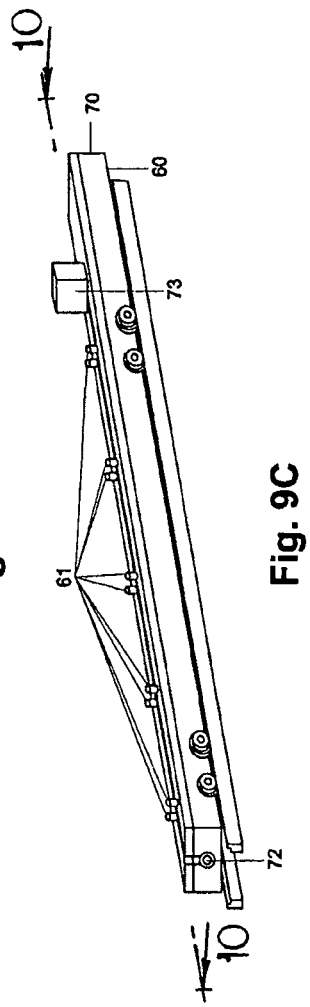

To be able to mount such a linear drive arrangement, a mounting device is provided according to an embodiment of the invention, as illustrated in FIGS. 9A-9C. The mounting device has a part 50 for arresting, i.e. for stationarily positioning the reception profile 20 for the linear drive arrangement.

The reception profile 20 is clamped on the arresting part 50 preferably by clamping jaws 51 and thereby held in position. Seen in longitudinal direction of the reception profile 20, the clamping jaws 51 preferably press against a respective exterior lateral wall of the reception profile 20.

At a side facing the reception profile 20, each clamping jaw 51 has preferably a clamping lining 51a, which prevents the reception profile 20 from being damaged in the clamped condition and is made for example from an elastic plastic material. Likewise the clamping jaws 51 may be made entirely from such a damage preventing material.

The clamping jaws 51 may be disposed stationarily at the arresting part 50 or they may be supported to be displaceable in a direction transversely to the longitudinal extension of the reception profile 20 away from the latter. This support may be realized for example by a dovetail guide, shown in FIGS. 9A and 9B. A vertically extending disposed clamping screw 54 is provided to arrest the respective clamping jaw 51 in its position, in that the clamping screw 54 preferably bears against an opposite inner side of the dovetail guide in the arresting part 50.

An inserting assistant 53 is disposed at one end of the arresting part 50. The inserting assistant 53 is a part, which comes to rest with one side at the reception profile 20. Oriented towards an end, facing away from the reception profile 20, the inserting assistance has at least one ramp-shaped surface. The at least one ramp-shaped surface is slanted to the outside with regard to the reception profile 20, in a direction away from the reception profile 20. The inserting assistance 53 preferably terminates flush with the end of the arresting part 50.

In addition, an abutment 52, in the shape of an upwards extending lateral wall, may be configured at an end of the arresting part 50 facing away from the inserting assistance 53, which wall has likewise preferably a clamping lining at a side facing the reception profile 20. The wall may be integrally configured with the arresting part 50 or it may be received to be supported displaceably for example like the clamping jaws 51, this time in the direction of the longitudinal extension of the arresting part 50.

It is furthermore preferred that the mounting device comprises a slide-in device 60, which is adapted to receive the components of the linear drive system which need to be slid into the reception profile 20. The slide-in device 60 is preferably equipped with rollers which are disposed to roll on respectively one guiding rail. The guiding rails are disposed such as to be disposed extending away from the end of the arresting part 50, at which the inserting assistance 53 is disposed, and essentially in the direction of the longitudinal extension of the arresting part 50. The direction of extension of the guiding rails extends at least over a length in the direction of the longitudinal extension of the arresting part 50 such as to guarantee that the slide-in device 60 with its longitudinal extension, in a condition in which it abuts at the inserting assistance 53, is disposed parallel to the longitudinal extension of the arresting part 50.

For receiving and stationarily positioning the components to be mounted, the slide-in device 60 has slip-on sections 61 preferably in the shape of pins, which protrude from an upper supporting surface of the slide-in device 60. At corresponding locations, the components have slip-on recesses.

The pins are preferably resiliently supported in protruding direction. In the normal condition, the pins protrude from the slide-in device 60.

The pins are preferably made from a magnetizable material. Below the pins, respectively their spring supports, preferably electrical coils are disposed in the slide-in device 60, which, when applying electrical energy, retract the pins into the slide-in device such that a respective component can then be displaced on the supporting surface of the slide-in device 60.

To not have to push the components manually into the reception profile 20, the slide-in device is furthermore provided with a push mechanism 70. In the example shown in FIG. 9, the push mechanism 70 is formed by a spindle drive. It has a drive motor 71, the output shaft thereof being operatively connected to a threaded spindle 72, respectively being integrally configured with it.

The threaded spindle 72 is received freely rotatably supported in the push mechanism 70. An abutment member 73, as a driver for a, with regard to the sliding-in, last component is disposed on the threaded spindle 72. The abutment member 73 has a bushing with female thread, by means of which the abutment member 73 is screwed onto the threaded spindle 72 and is movable translationally into the direction of the arresting part 50 in FIG. 9A or away from the latter, by means of rotating the threaded spindle 72.

Figure 10:
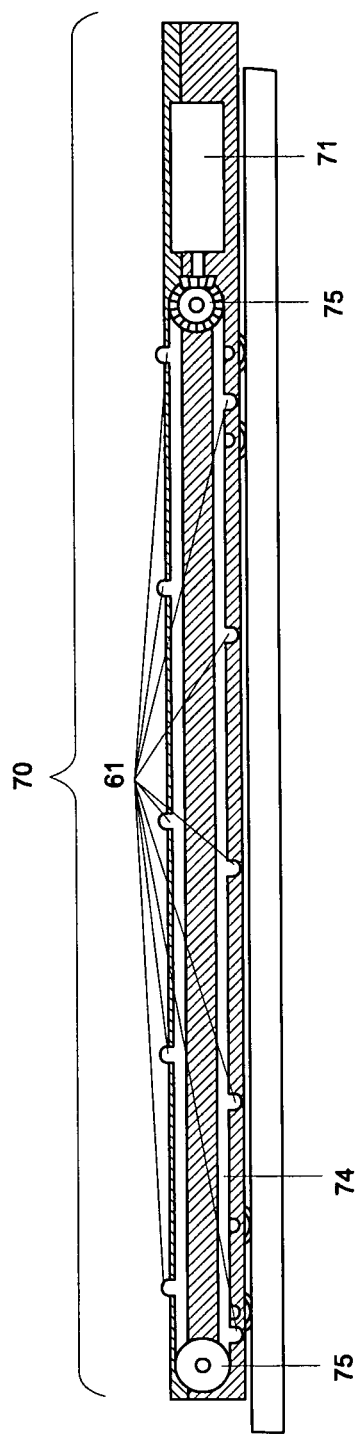
FIG. 10 is a slide-in device according to an embodiment of the invention for the mounting device of FIG. 9.

According to an alternative embodiment of the invention, shown in FIG. 10, the push mechanism 70 is formed by a flexible drive. The slip-on sections 61 are configured on the traction means, illustrated by way of example as a rope 74, and namely preferably as revolving. One of two rope deflection pulleys 75, around which the rope 74 is laid to revolve, is operatively connected to a drive motor 71. The operative connection may be formed for example by means of a bevel gear.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An arrangement for a linear drive system, comprising:
at least one stator member of a linear motor;
circuitry for the linear drive system; and
a connecting member disposed longitudinally consecutively in a row with respect to the at least one stator member, the connecting member comprises:
a housing, having at least one connection for an external energy supply at a first end, the housing further configured to receive the circuitry;
at least one additional terminal; and
a channel arranged in the connecting member configured to receive connecting lines for connection to the at least one additional terminal wherein the connecting lines are led out of the housing at the first end of the housing,
wherein the connecting member further comprises at least one terminal for a stator member of the linear motor arranged at a second end of the connecting member, the second end of the connecting member opposite the first end of the connecting member.

2. The arrangement according to claim 1, wherein the circuitry for the linear drive system is arranged proximate to the at least one connection.

3. The arrangement according to claim 1, wherein the connecting member further comprises at least one lead-through adapted for the connecting lines to pass therethrough.

4. The arrangement according to claim 3, wherein, each lead-through adapted for the connecting lines to pass therethrough comprises a plurality of webs that extend in an inner space of the connecting member transversely with respect to a longitudinal extension of the connecting member, the plural webs having at least one of recesses and through-openings, the at least one of recesses and through-openings configured according to an exterior dimension of the connecting lines.

5. The arrangement according to claim 4, wherein a cover member is disposed at an exterior side of the connecting member at each respective lead-through and configured to cover the respective lead-through.

6. The arrangement according to claim 5, wherein the respective cover members are releasably disposed in the housing.

7. The arrangement according to claim 6, wherein the respective cover members are clamped to the housing.

8. The arrangement according to claim 1, wherein the connecting member is arranged at an open side of a sliding door installation, and wherein the connecting member together with the at least one connection forms an end of the linear drive system.

9. The arrangement according to claim 8, wherein a control circuit is arranged at another end of the linear drive system.

10. The arrangement according to claim 1, further comprising a reception profile wherein the at least one stator member and the connecting member are received in the reception profile.

11. The device for mounting the linear drive system according to claim 10, the device comprising:
an arresting part configured to stationarily arrest the reception profile; and
an inserting assistant arranged such that the inserting assistant is flush with at least one inner surface of the reception profile at an end of the reception profile facing the stator member and the connecting member and onto which the stator member and the connecting member are slid-on,
the inserting assistant further comprises at least one ramp-shaped surface towards an end facing away from the reception profile, the ramp shaped surface being slanted in a direction away from the reception profile to an outside with regard to the reception profile.

12. The device according to claim 11, further comprising a slide-in device adapted to stationarily receive the stator member and the connecting member, wherein the stator member and the connecting member comprise reception openings arranged at least at one side pointing in one direction, by which the stator member and the connecting member can be slipped-on a respective slip-on sections of the slide-in device, wherein the reception openings and the slip-on sections are complementarily configured in cross-section.

13. The device according to claim 12, wherein the slip-on sections are retractable.

14. The device according to claim 13, wherein the slip-on sections comprise a magnetizable material and are disposed to be displaceable in a direction towards a respective reception opening of one of the stator member and the connecting member and are resiliently supported in a direction of a respective reception opening, wherein, a magnetically excitable device is disposed such that activating the magnetically excitable device causes a retraction of respective slip-on sections.

15. The device according to claim 13, further comprising a push device configured to move the stator member and the connecting member from the slide-in device in a direction of, and into, the reception profile.

16. An arrangement for a linear drive system, comprising:
at least one stator member of a linear motor;
circuitry for the linear drive system;
a connecting member disposed longitudinally consecutively in a row with respect to the at least one stator member, the connecting member comprises:
  a housing, having at least one connection for an external energy supply at a first end, the housing further configured to receive the circuitry;
  at least one additional terminal; and
  a channel arranged in the connecting member configured to receive connecting lines for connection to the at least one additional terminal wherein the connecting lines are led out of the housing at the first end of the housing; and
a reception profile wherein the at least one stator member and the connecting member are received in the reception profile,
wherein the reception profile comprises at least two attachment devices configured to mount the reception profile, wherein the connecting member has respective through-openings at locations that correspond to locations at which the reception profile has the at least two attachment devices, the through-openings passing through the connecting member to an exterior side of the connecting member facing the reception profile.

17. The arrangement according to claim 16, wherein the attachment devices are configured as openings and respective attachment screws are disposed as passing through the openings.

18. The arrangement according to claim 16, wherein each through-openings comprises a surrounding wall section that extends into the inner space of the connecting member, each respective surrounding wall configured to separate the respective through-opening from an inner space of the connecting member.

19. The arrangement according to one of the claim 16, wherein the additional terminals are disposed on a circuit board, the circuit board having circuit board openings at respective locations corresponding to the through-openings of the connecting member.

20. The arrangement according to claim 19, wherein circuit components are disposed on the circuit board and wherein the housing has through-openings at an exterior side towards which the circuit components are pointing.

* * * * *